(12) United States Patent
Chen et al.

(10) Patent No.: US 12,421,337 B2
(45) Date of Patent: Sep. 23, 2025

(54) RESIN COMPOSITION AND CURED FILM

(71) Applicant: eChem Solutions Corp., Taoyuan (TW)

(72) Inventors: Ya-Qian Chen, Taoyuan (TW); Yu-Chun Chen, Taoyuan (TW)

(73) Assignee: eChem Solutions Corp., Taoyuan (TW)

( * ) Notice: Subject to any disclaimer, the term of this patent is extended or adjusted under 35 U.S.C. 154(b) by 405 days.

(21) Appl. No.: 17/955,504

(22) Filed: Sep. 28, 2022

(65) Prior Publication Data

US 2023/0107355 A1 Apr. 6, 2023

(30) Foreign Application Priority Data

Sep. 30, 2021 (TW) ................. 110136439

(51) Int. Cl.
| | |
|---|---|
| C08F 220/68 | (2006.01) |
| C08F 222/10 | (2006.01) |
| C08K 3/22 | (2006.01) |
| C08L 35/02 | (2006.01) |

(52) U.S. Cl.
CPC ............. C08F 220/68 (2013.01); C08K 3/22 (2013.01); *C08F 222/1025* (2020.02); *C08K 2003/2241* (2013.01); *C08K 2003/2244* (2013.01); *C08L 35/02* (2013.01)

(58) Field of Classification Search
CPC .... C08F 220/68; C08F 222/1025; C08K 3/22; C08K 2003/2241; C08K 2003/2244; C08L 35/02
See application file for complete search history.

(56) References Cited

U.S. PATENT DOCUMENTS

| | | | |
|---|---|---|---|
| 8,629,222 B2 | 1/2014 | Takizawa et al. | |
| 2014/0058038 A1* | 2/2014 | Hunt | C09D 133/06 524/783 |
| 2014/0138131 A1* | 5/2014 | Hao | G06F 3/044 156/60 |
| 2019/0389147 A1* | 12/2019 | Heikkila | B29C 65/64 |

FOREIGN PATENT DOCUMENTS

| | | |
|---|---|---|
| CN | 106104380 | 11/2016 |
| CN | 106468857 | 3/2017 |
| CN | 109071693 | 12/2018 |
| CN | 110114419 | 8/2019 |
| CN | 111435220 | 7/2020 |
| JP | 2008249987 | 10/2008 |
| JP | 2009256293 | 11/2009 |
| JP | 2019066779 | 4/2019 |
| TW | 200630228 | 9/2006 |
| TW | 200730581 | 8/2007 |
| TW | 201105723 | 2/2011 |
| TW | I475050 | 3/2015 |
| TW | I567114 | 1/2017 |
| TW | 201723008 | 7/2017 |
| TW | I635105 | 9/2018 |
| TW | I658057 | 5/2019 |
| WO | WO-2017170668 A1 * | 10/2017 ................ C08F 2/44 |

OTHER PUBLICATIONS

Machine translation of WO-2017170668-A1 from IP.com (Year: 2017).*
"Office Action of Taiwan Counterpart Application", issued on Apr. 29, 2022, p. 1-p. 3.
"Office Action of China Counterpart Application", issued on Jun. 27, 2023, p. 1-p. 8.

* cited by examiner

*Primary Examiner* — Kregg T Brooks
*Assistant Examiner* — David R. Foss
(74) *Attorney, Agent, or Firm* — JCIPRNET

(57) ABSTRACT

A resin composition and a cured film are provided. The resin composition includes a monomer mixture (A), a siloxane compound (B), a curing agent (C), and inorganic particles (D). The monomer mixture (A) includes a bisphenol fluorene compound (A-1) represented by Formula (I-1). The siloxane compound (B) has a group represented by Formula (II-a).

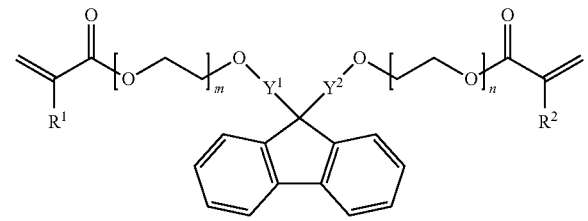

Formula (I-1)

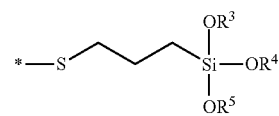

Formula (II-a)

6 Claims, No Drawings

RESIN COMPOSITION AND CURED FILM

CROSS-REFERENCE TO RELATED APPLICATION

This application claims the priority benefit of Taiwan application serial no. 110136439, filed on Sep. 30, 2021. The entirety of the above-mentioned patent application is hereby incorporated by reference herein and made a part of this specification.

BACKGROUND

Technical Field

The disclosure relates to a composition and a cured film, particularly to a resin composition and a cured film.

Description of Related Art

Compared with lenses made of inorganic materials such as glass, plastic lenses have the advantages of being lighter in weight, not easy to break, and convenient for processing. Therefore, they are often adopted as optical materials like spectacle lenses and lenses for portable cameras. However, in order to reduce the thickness of the plastic lens, there is still a need to develop a material that has high refractive index, high transmittance, high thermal yellowing resistance, and high thermal impact resistance to replace the glass lens.

Generally, plastic lenses adopt organic materials as its main components. Since it is difficult to achieve high refractive index by using only organic materials, inorganic particles are often added to achieve so. However, as inorganic particles are prone to aggregation, it is difficult to disperse them uniformly, and the cured film formed thereof tends to have poor transmittance and poor heat resistance, which in turn affects optical properties. Furthermore, to make the cured film have a higher transmittance, the thickness of the cured film is usually reduced to achieve the desired optical effect, but the application of the cured film with a low thickness is also quite limited.

On the other hand, the industry has currently developed materials for cured films using ethylenically unsaturated monomers and inorganic nanoparticles with high refractive index. However, ethylenically unsaturated monomers and inorganic nanoparticles with high refractive index are usually rigid, making the cured film brittle and have poor weather resistance, which is not conducive to processing. Furthermore, in order to improve the weather resistance and flexibility of the cured film, the industry has also developed the technique that adds long carbon chain-containing ethylenically unsaturated monomers to solve the problem of fragility of the cured film, but it may reduce the refractive index of the cured film, which still in turn affects the optical properties. Lastly, although the use of a highly conjugated aromatic ring and an ethylenically unsaturated monomer with high sulfur content helps increase the refractive index, it is still likely for the cured film to have poor heat resistance and turn yellow.

Therefore, it is not easy to develop a cured film that has high refractive index, high transmittance, high thermal yellowing resistance, and high thermal impact resistance to replace the glass lens.

SUMMARY

In view of this, the present disclosure provides a resin composition with high refractive index, high transmittance, high thermal yellowing resistance, and high thermal impact resistance, and a cured film formed thereof, which is suitable for various optical components.

The present disclosure provides a resin composition, including: a monomer mixture (A), a siloxane compound (B), a curing agent (C), and inorganic particles (D). The monomer mixture (A) includes a bisphenol fluorene compound (A-1) represented by Formula (I-1). The siloxane compound (B) has a group represented by Formula (II-a).

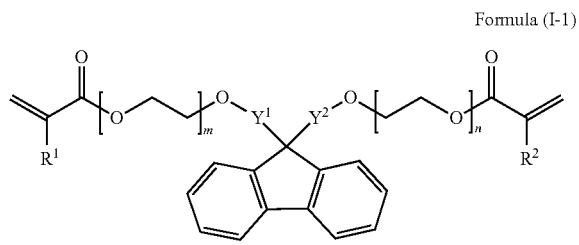

Formula (I-1)

In Formula (I-1), $R^1$ and $R^2$ each independently represent a hydrogen atom or a methyl group, $Y^1$ and $Y^2$ each independently represent a substituted phenylene group, or an unsubstituted phenylene group, and m and n each independently represent an integer of 1 to 9.

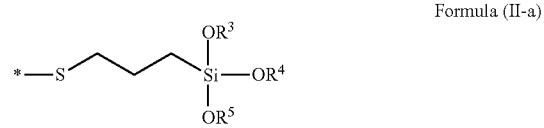

Formula (II-a)

In Formula (II-a), $R^3$, $R^4$, and $R^5$ each independently represent an alkyl group having a carbon number of 1 to 3, and * represents a bonding position.

In an embodiment of the present disclosure, the monomer mixture (A) further includes a thiol compound (A-2). The thiol compound (A-2) has two or more groups represented by Formula (I-2).

Formula (I-2)

In Formula (I-2), * represents a bonding position.

In an embodiment of the present disclosure, the monomer mixture (A) further includes an ethylenically unsaturated group-containing compound (A-3) represented by Formula (I-3).

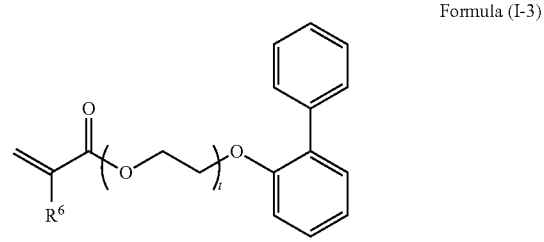

Formula (I-3)

In Formula (I-3), $R^6$ represents a hydrogen atom or a methyl group, and t is an integer of 1 to 3.

In an embodiment of the present disclosure, the inorganic particles (D) include zirconium oxide, titanium oxide, or a combination thereof.

In an embodiment of the present disclosure, the average refractive index of the inorganic particles (D) is 1.67 or more for light having a wavelength of 400 nm to 700 nm.

In an embodiment of the present disclosure, the average particle diameter of the inorganic particles (D) is 5 nm to 100 nm.

In an embodiment of the present disclosure, the siloxane compound (B) is 5 parts by weight to 20 parts by weight, the curing agent (C) is 1 part by weight to 10 parts by weight, and the inorganic particle (D) is 5 parts by weight to 30 parts by weight relative to 100 parts by weight of the monomer mixture (A).

The present disclosure provides a cured film formed of the resin composition.

In an embodiment of the present disclosure, the cured film has a refractive index of 1.70 or more for light having a wavelength of 550 nm.

In an embodiment of the present disclosure, the cured film has an average transmittance of 95% or more for light having a wavelength of 400 nm to 700 nm.

Based on the above, the resin composition of the present disclosure includes a specific monomer mixture (A), a specific siloxane compound (B), a curing agent (C), and inorganic particles (D). The cured film formed thereof has high refractive index, high transmittance, high thermal yellowing resistance, and high thermal impact resistance, which is beneficial to subsequent processing and has a wider range of applications to be suitable for various optical components.

DESCRIPTION OF THE EMBODIMENTS

<Resin Composition>

This embodiment provides a resin composition including: a monomer mixture (A), a siloxane compound (B), a curing agent (C), and inorganic particles (D). In addition, the resin composition may further include a solvent (E), an additive (F), or a combination thereof if necessary. Each component of the resin composition is explained in detail hereinafter.

In this specification, "(meth)acrylic acid" indicates "acrylic acid" and/or "methacrylic acid"; "(meth)acrylate" indicates "acrylate" and/or "methacrylate"; and "(meth)acryloyl" indicates "acryloyl" and/or "methacryloyl".

Monomer Mixture (A)

The monomers in the monomer mixture (A) may undergo polymerization reaction so that the resin composition forms a cured film.

The monomer mixture (A) includes the bisphenol fluorene compound (A-1). And, the monomer mixture (A) may further include a thiol compound (A-2), an ethylenically unsaturated group-containing compound (A-3), an epoxy group-containing compound (A-4), and an oxetanyl-containing compound (A-5), or a combination thereof.

Bisphenol Fluorene Compound (A-1)

The bisphenol fluorene compound (A-1) is a compound represented by Formula (I-1) as follows.

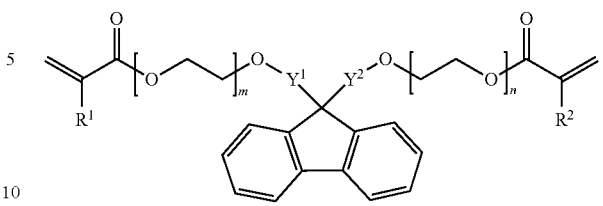

Formula (I-1)

In Formula (I-1), $R^1$ and $R^2$ each independently represent a hydrogen atom or a methyl group; $Y^1$ and $Y^2$ each independently represent a substituted phenylene group, or an unsubstituted phenylene group; and m and n each independently represent an integer of 1 to 9.

In one embodiment, in Formula (I-1), $R^1$ and $R^2$ both represent a hydrogen atom, $Y^1$ and $Y^2$ both represent an unsubstituted phenylene group, and both m and n represent 1.

In one embodiment, in Formula (I-1), $R^1$ and $R^2$ both represent a hydrogen atom, $Y^1$ and $Y^2$ both represent an unsubstituted phenylene group, m and n each independently represent an integer of 1 to 9, and the sum of m and n is 10.

Specific examples of the bisphenol fluorene compound (A-1) include a mixture of compounds represented by Formula (I-1-1) and m-phenoxy benzyl (meth)acrylate (PBA) (manufactured by HANNONG CHEMICALS INC.), compound represented by Formula (I-1-2) (manufactured by Miwon Co., Ltd.), or a combination thereof.

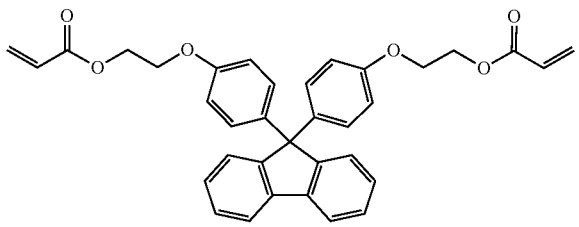

Formula (I-1-1)

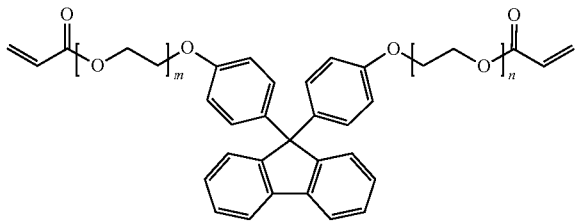

Formula (I-1-2)

In Formula (I-1-2), m and n each independently represent an integer of 1 to 9, and the sum of m and n is 10.

The bisphenol fluorene compound (A-1) is 20 parts by weight to 80 parts by weight, preferably 35 parts by weight to 70 parts by weight, relative to 100 parts by weight of the monomer mixture (A).

Thiol Compound (A-2)

The monomer mixture (A) may further include a thiol compound (A-2).

The thiol compound (A-2) has two or more groups represented by Formula (I-2).

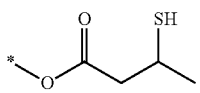

Formula (I-2)

In Formula (I-2), * represents the bonding position.

Specific examples of the thiol compound (A-2) include trimethylolpropane tris(3-mercaptobutyrate), trimethylolethane tris(3-mercaptobutyrate), 1,4-butanediol bis(3-mercaptobutyrate), tris[2-(3-mercaptobutyrate)ethyl]isocyanurate, pentaerythritol tetrakis(3-mercaptobutyrate), or a combination thereof. Specific examples of the thiol compound (A-2) preferably include pentaerythritol tetrakis(3-mercaptobutyrate).

The thiol compound (A-2) is 0 part by weight to 30 parts by weight, preferably 0 part by weight to 15 parts by weight relative to 100 parts by weight of the monomer mixture (A).

Ethylenically Unsaturated Group-Containing Compound (A-3)

The monomer mixture (A) may further include an ethylenically unsaturated group-containing compound (A-3).

The ethylenically unsaturated group-containing compound (A-3) is a compound represented by Formula (I-3).

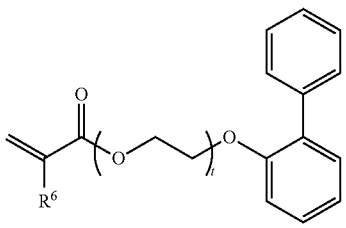

Formula (I-3)

In Formula (I-3), $R^6$ represents a hydrogen atom or a methyl group, and t is an integer of 1 to 3.

Specific examples of the ethylenically unsaturated group-containing compound (A-3) include monofunctional (meth)acrylate compounds that has high refractive index, such as m-phenoxy benzyl (meth)acrylate (PBA), phenylthioethyl (meth)acrylate (PTEA), o-phenylphenoxyethyl (meth)acrylate, and naphthylthioethyl (meth)acrylate (NTEA);

monofunctional (meth)acrylates, such as n-butyl (meth)acrylate, isobutyl (meth)acrylate, tertiary butyl (meth)acrylate, n-pentyl (meth)acrylate, n-hexyl (meth)acrylate, n-octyl (meth)acrylate, isooctyl (meth)acrylate, 2-ethylhexyl (meth)acrylate, benzyl (meth)acrylate, glycidyl (meth)acrylate, morpholine(meth)acrylate, 2-hydroxyethyl (meth)acrylate, 2-hydroxypropyl (meth)acrylate, 4-hydroxybutyl (meth)acrylate, diethylene glycol mono(meth)acrylate, triethylene glycol mono(meth)acrylate, dipropylene glycol mono(meth)acrylate, 2-methoxyethyl (meth)acrylate, methoxydiethyl glycol (meth)acrylate, methoxytriethylene glycol (meth)acrylate, methoxypolyethylene glycol (meth)acrylate, 2-butoxyethyl (meth)acrylate, butoxytriethylene glycol (meth)acrylate, 2-ethoxyethyl (meth)acrylate, 2-(2-ethoxy)ethyl (meth)acrylate, ethoxy polyethylene glycol (meth)acrylate, 4-nonylphenoxyglycol (meth)acrylate, tetrahydrofurfuryl (meth)acrylate, caprolactone modified tetrahydrofurfuryl (meth)acrylate, isobornyl (meth)acrylate, 2-hydroxy-3-phenoxypropyl (meth)acrylate, cyclohexyl (meth)acrylate, cyclohexyl methyl (meth)acrylate, cyclohexyl ethyl (meth)acrylate, dicyclopentyl (meth)acrylate, dicyclopentyloxyethyl (meth)acrylate, dicyclopentenyl (meth)acrylate, dicyclopentenyloxyethyl (meth)acrylate, phenoxyethyl (meth)acrylate, phenoxydiethylene glycol (meth)acrylate;

bifunctional aliphatic (meth)acrylate compounds, such as ethylene glycol di(meth)acrylate, diethylene glycol di(meth)acrylate, triethylene glycol di(meth)acrylate, polyethylene glycol di(meth)acrylate, propylene glycol di(meth)acrylate, dipropylene glycol di(meth)acrylate, tripropylene glycol di(meth)acrylate, butylene glycol di(meth)acrylate, tetrabutylene glycol di(meth)acrylate, 1,4-butanediol di(meth)acrylate, 1,6-hexanediol di(meth)acrylate, 1,9-nonanediol di(meth)acrylate, neopentyl glycol di(meth)acrylate, dicyclopentyl di(meth)acrylate, glycerol di(meth)acrylate, neopentyl glycol hydroxytrimethyl acetate di(meth)acrylate, caprolactone modified hydroxytrimethylacetate neopentyl glycol di(meth)acrylate, hydroxytrimethylacetaldehyde modified trimethylolpropane di(meth)acrylate, 1,4-cyclohexanedimethane di(meth)acrylate; or a combination of the above compounds.

Specific examples of the ethylenically unsaturated group-containing compound (A-3) preferably include ortho-phenyl phenoxy ethyl acrylate (OPPEA).

The ethylenically unsaturated group-containing compound (A-3) is 10 parts by weight to 60 parts by weight, preferably 20 parts by weight to 50 parts by weight, relative to 100 parts by weight of the monomer mixture (A).

Epoxy Group-Containing Compound (A-4)

Specific examples of the epoxy group-containing compound (A-4) include dicyclopentadiene dioxide, limonene dioxide, 4-vinylcyclohexane dioxide, 3,4-epoxycyclohexylmethyl-3,4-epoxycyclohexane carboxylate, bis(3,4-epoxycyclohexyl) adipate, bisphenol A epoxy resin, halogenated bisphenol A epoxy resin, hydrogenated bisphenol A epoxy resin, bisphenol S diglycidyl ether, bisphenol F epoxy resin, 1,6-hexanediol diglycidyl ether, polybutylene glycol diglycidyl ether, compound in which both ends of polybutadiene are glycidyl etherified, o-cresol novolac epoxy resin, m-cresol novolac epoxy resin, p-cresol novolac epoxy resin, phenol novolac epoxy resin, trimethoxypropane triglycidyl ether, pentaerythritol tetraglycidyl ether, polybutadiene internal epoxidation product, Celloxide 8010 (alicyclic epoxy compounds having a cycloalkene oxide structure, manufactured by Daicel Chemical Co., Ltd.), or a combination thereof. Specific examples of the epoxy group-containing compound (A-4) preferably include Celloxide 8010 (alicyclic epoxy compounds having a cycloalkene oxide structure, manufactured by Daicel Chemical Co., Ltd.).

The epoxy group-containing compound (A-4) is 0 part by weight to 50 parts by weight, preferably 0 part by weight to 30 parts by weight, relative to 100 parts by weight of the monomer mixture (A).

Oxetanyl-Containing Compound (A-5)

Specific examples of the oxetanyl-containing compound (A-5) include 1,4-bis{[(3-ethyl-3-oxetanyl)methoxy]methyl}benzene, bis[2-(3-oxetanyl)butyl]ether, 1,4-bis[(3-ethyloxetan-3-yl)methoxy]benzene, 1,3-bis[(3-ethyloxetan-3-yl)methoxy]benzene, 1,2-bis[(3-ethyloxetan-3-yl)methoxy]benzene, 4,4'-bis[(3-ethyloxetan-3-yl)methoxy]diphenyl, 2,2'-bis[(3-ethyl-3-oxetanyl)methoxy]biphenyl, 3,3',5,5'-tetramethyl[4,4'-bis(3-ethyloxetan yl)methoxy]biphenyl, 2,7-bis[(3-ethyloxetan-3-yl)methoxy]naphthalene, 3 (4),8(9)-bis[1-ethyl-3-oxetanyl)methymethyl]-tricyclo [5.2.1.0$^{2,6}$]decane, 1,2-bis{2-[(1-ethyl oxetanyl)methoxy] ethylthio}ethane, 4,4'-bis[(1-ethyl-3-oxetanyl)methyl]thiodiphenyl thioether, 2,3-[(3-ethyloxetane-3-yl) methoxymethyl]norbornane, 2-ethyl-2-[(3-ethyloxetan-3- yl)methoxymethyl]-1,3-O-bis[(1-ethyl-3-oxetanyl)methyl]-propane-1,3-diol, 2,2-dimethyl-1,3-O-bis[(3-ethyloxetan-3-yl)methyl]-propane-1,3-diol, 2-butyl-2-ethyl-1,3-O-bis[(3-ethyloxetane-3-yl)methyl]-propane-1,3-diol, 1,4-O-bis[(3-ethyloxetan-3-yl)methyl]-butane-1,4-diol, 2,4,6-O-tris[(3-ethyloxetan-3-yl)methyl]cyanuric acid, ether compound of bisphenol A and 3-ethyl-3-chloromethyloxetane, THM402 (a compound having a (meth)acryloyl group and an oxetanyl group, manufactured by TRONLY ENTERPRISE CO., LIMITED), or a combination thereof. Specific examples of the oxetanyl-containing compound (A-5) preferably include THM402 (manufactured by TRONLY ENTERPRISE CO., LIMITED).

The oxetanyl-containing compound (A-5) is 0 part by weight to 30 parts by weight, preferably 0 part by weight to 15 parts by weight, relative to 100 parts by weight of the monomer mixture (A).

Siloxane Compound (B)

The siloxane compound (B) makes the cured film formed of the resin composition have better volume shrinkage, so that the cured film has good resistance to thermal impact.

The siloxane compound (B) has a group represented by Formula (II-a).

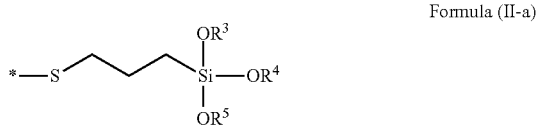

Formula (II-a)

In Formula (II-a), $R^3$, $R^4$, and $R^5$ each independently represent an alkyl group having a carbon number of 1 to 3, and * represents a bonding position.

Specific examples of the siloxane compound (B) include (3-mercaptopropyl)trimethoxysilane, (3-mercaptopropyl)triethoxysilane, the compound represented by Formula (II-1), trimethoxy(3-((3-(2-methyl-3-(9-(3-methyl-4-(3-(trimethoxysilyepropyl)thio)propoxy)phenyl)-9H-fluoren-9-yl)phenoxy)propyl)thio)propyl)silane, or a combination thereof. Specific examples of the siloxane compound (B) preferably include (3-mercaptopropyl)trimethoxysilane, a compound represented by Formula (II-1), or a combination thereof.

Formula (II-1)

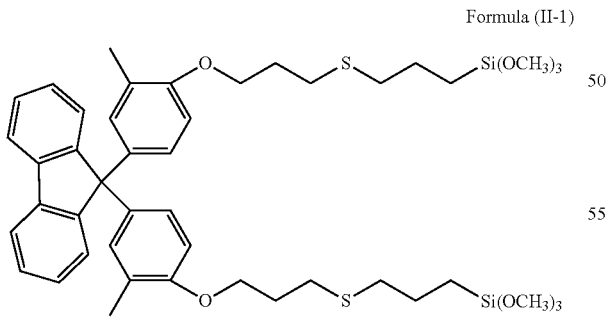

When the resin composition contains the siloxane compound (B) having the group represented by Formula (II-a), the cured film formed by the resin composition has good thermal impact resistance. In contrast, when the resin composition does not contain the siloxane compound (B) having the group represented by Formula (II-a), the cured film formed thereof has poor thermal impact resistance.

Note that, in this embodiment, by combining the bisphenol fluorene compound (A-1) and the siloxane compound (B) having a group represented by Formula (II-a), the cured film formed by the resin composition has high refractive index, high transmittance, high thermal yellowing resistance, and high thermal impact resistance.

The siloxane compound (B) is 5 parts by weight to 20 parts by weight, preferably 5 parts by weight to 15 parts by weight, relative to 100 parts by weight of the monomer mixture (A). When the content of the siloxane compound (B) is in the above range, the cured film formed of the resin composition has a better refractive index and transmittance.

Curing Agent (C)

The curing agent (C) generates free radicals or cations and initiates the polymerization reaction of the monomer mixture (A) during the exposure or the heating step so that the resin composition forms a cured film.

There is no particular restriction on the curing agent (C), which may include but not limited to a light (cationic) reactive curing agent, a thermal (cationic) reactive curing agent, or a combination thereof.

Specific examples of light (cationic) reactive curing agents include acylphosphine oxide compounds, triazine compounds, acetophenone compounds, diphenyl ketone compounds, biimidazole compounds, thioxanthone compounds, quinone compounds, oxime ester compounds, hexafluoroantimonate, pentafluorohydroxyantimonate, hexafluorophosphate, hexafluoroarsenate, or a combination thereof.

The acylphosphine oxide compounds may include, but not limited to, diphenyl(2,4,6-trimethylbenzoyl)phosphine oxide (product name: TPO, manufactured by Chembridge International Corp., made of the compound represented by Formula (III-1-1) as shown below), bis-(2,6-dimethoxybenzoyl)-2,4,4-trimethylbenzyl phosphine oxide, phenylbis(2,4,6-trimethylbenzoyl)phosphine oxide (product name: Irgacure 819, manufactured by BASF, made of the compound represented by Formula (III-1-2) shown as below), or a combination thereof.

Formula (III-1-1)

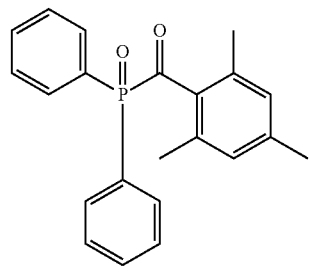

Formula (III-1-2)

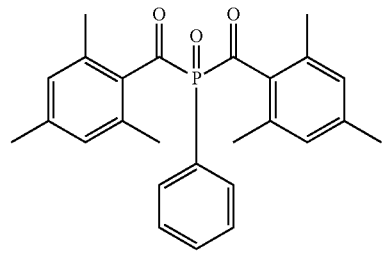

The triazine compounds may include, but not limited to, chemcure-PAG-1 (product name; manufactured by Chembridge International Corp.), chemcure-PAG-2 (product name; manufactured by Chembridge International Corp.), or a combination thereof.

The acetophenone compounds may include, but not limited to, p-dimethylamino-acetophenone, α,α'-dimethoxyazoxy-acetophenone, 2,2'-dimethyl-2-phenyl-acetophenone, p-methoxy-acetophenone, 2-methyl-1-(4-methylthiophenyl)-2-morpholino-1-propanone, 2-benzyl-2-N,N-dimethylamino-1-(4-morpholinophenyl)-1-butanone, or a combination thereof.

The diphenyl ketone compounds may include, but not limited to, chemcure-BP, chemcure-64 (both product name; manufactured by Chembridge International Corp.), or a combination thereof.

The biimidazole compounds may include, but not limited to, 2,2'-bis(o-chlorophenyl)-4,4',5,5'-tetraphenyl-biimidazole, 2,2'-bis(o-fluorophenyl)-4,4',5,5'-tetraphenyl-biimidazole, 2,2'-bis(o-methylphenyl)-4,4',5,5'-tetraphenyl-biimidazole, 2,2'-bis(o-methoxyphenyl)-4,4',5,5'-tetraphenyl-biimidazole, 2,2'-bis(o-ethylphenyl)-4,4',5,5'-tetraphenyl-biimidazole, 2,2'-bis(p-methoxyphenyl)-4,4',5,5'-tetraphenyl-biimidazole, 2,2'-bis(2,2',4,4'-tetramethoxyphenyl)-4,4',5,5'-tetraphenyl-biimidazole, 2,2'-bis(2-chlorophenyl)-4,4',5,5'-tetraphenyl-biimidazole, 2,2'-bis(2,4-dichlorophenyl)-4,4',5,5'-tetraphenyl-biimidazole, or a combination thereof.

The thioxanthone compounds may include, but not limited to, IRGACURE-ITX (product name; manufactured by BASF) or a combination thereof.

The quinone compounds may include, but not limited to, anthraquinone, 1,4-naphthoquinone, or a combination thereof.

The oxime ester compounds may include, but not limited to, the compound represented by Formula (III-2-1) (1,2-octanedione,1-[4-(phenylthio)phenyl-,2-(O-benzyloxime)]), (product name: IRGACURE OXE-01, manufactured by BASF), a compound represented by Formula (III-2-2) (product name: PBG-3057, manufactured by Changzhou Tronly New Electronics Materials Co., Ltd.), or a combination thereof.

Formula (III-2-1)

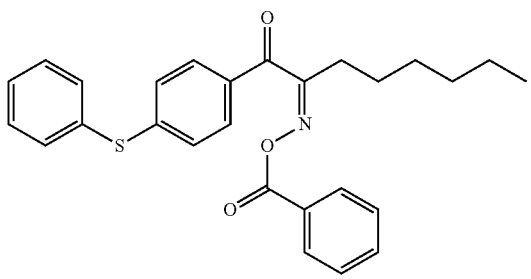

Formula (III-2-2)

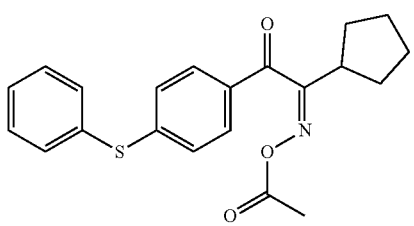

The hexafluoroantimonate may include, but not limited to, 4-acetylphenyl dimethyl sulfonium hexafluoroantimonate, dimethyl-4-(benzyloxycarbonyloxy) phenyl sulfonium hexafluoroantimonate, dimethyl-4-(benzoyloxy)phenyl sulfonium hexafluoroantimonate, or a combination thereof.

The pentafluorohydroxyantimonate may include, but not limited to, diphenyl thiophenoxyphenyl sulfonium pentafluorohydroxyantimonate.

The hexafluorophosphate may include, but not limited to, benzyl-4-hydroxyphenylmethyl sulfonium hexafluorophosphate, 4-methoxybenzyl-4-hydroxyphenylmethyl sulfonium hexafluorophosphate, 4-(phenylthio)phenyl diphenyl sulfonium hexafluorophosphate, or a combination thereof.

The hexafluoroarsenate may include, but not limited to, 4-acetoxyphenyl dimethyl sulfonium hexafluoroarsenate, dimethyl-4-(benzoyloxy) phenyl sulfonium hexafluoroarsenate, or a combination thereof.

Specific examples of the thermal (cationic) reactive curing agent includes benzoyl peroxide, methyl ethyl ketone peroxide, acetyl acetone peroxide, cyclohexanone peroxide, peroxydicarbonate bis(4-tertiary butyl cyclohexyl), tertiary butyl peroxide 2-ethylhexanoate, tertiary butyl cis-butadiene peroxide ester, tertiary butyl peroxy isopropyl carbonate, tertiary butyl peroxybenzoate, cumyl hydroperoxide, aryl diazonium salt, aryl iodonium salt, aryl sulfonium salt, arene-ion complex, CXC-1612 (manufactured by King Industries, Inc.), or a combination thereof.

Specific examples of the curing agent (C) preferably include phenylbis(2,4,6-trimethylbenzoyl)phosphine oxide, diphenyl(2,4,6-trimethylbenzoyl)phosphine oxide, 4-(phenylthio)phenyl diphenyl sulfonium hexafluorophosphate, 2-ethylhexanoate tert-butyl peroxide, CXC-1612 (manufactured by King Industries, Inc.), a combination thereof.

The curing agent (C) is 1 part by weight to 10 parts by weight, preferably 1 part by weight to 5 parts by weight, relative to 100 parts by weight of the monomer mixture (A).

Inorganic Particles (D)

The inorganic particles increase the refractive index of the cured film formed of the resin composition.

Specific examples of the inorganic particles (D) include zirconium oxide, titanium oxide, zinc oxide, silicon dioxide (silica), aluminum oxide, cerium oxide, or a combination thereof.

Specific examples of the inorganic particles (D) preferably include zirconium oxide, titanium oxide, or a combination thereof. Note that compared with zinc oxide, silicon dioxide (silica), aluminum oxide, and cerium oxide, zirconium oxide and titanium oxide have a higher refractive index, which may further increase the refractive index of the cured film.

The average refractive index of the inorganic particles (D) is 1.67 or more for light having a wavelength of 400 nm to 700 nm. When the average refractive index of the inorganic particles (D) is 1.67 or more, the refractive index of the cured film may be further increased.

The average particle diameter of the inorganic particles (D) is 5 nm to 100 nm, preferably 5 nm to 30 nm. When the average particle diameter of the inorganic particles (D) is in the above range, the cured film formed of the resin composition has a high transmittance while having a high refractive index.

Specific examples of the inorganic particles (D) include zirconium oxide (average particle diameter of 15.3 nm), titanium oxide (average particle diameter of 9.5 nm), or a combination thereof.

The inorganic particles (D) are 5 parts by weight to 50 parts by weight, preferably 10 parts by weight to 30 parts by weight, relative to 100 parts by weight of the monomer mixture (A).

When the content of the inorganic particles (D) is in the above range, the cured film formed of the resin composition may have a better refractive index while also having flexibility.

Solvent (E)

The resin composition of this embodiment may or may not include a solvent.

With the premise of not affecting the efficacy, the resin composition may further include a solvent (E).

There is no particular restriction on the solvent (E), which may include but not limited to propylene glycol monomethyl ether acetate (PGMEA), ethyl 3-ethoxypropionate (EEP), lactic acid ethyl ester, butyl lactate, benzyl alcohol, 3-methoxybutyl acetate (MBA), 3-methoxy-3-methylbutanol, γ-butyrolactone, propylene glycol monobutyl ether, or a combination thereof.

The weight ratio of the components in the resin composition other than the solvent (E) to the solvent (E) may be 1:5, preferably 1:1.

Additive (F)

With the premise of not affecting the efficacy of the present embodiment, in addition to the components mentioned above, the resin composition may also be added with an additive (F) as needed. There is no particular restriction on the additive (F). Specifically, the additives (F) may include leveling agents, photosensitizers, antioxidants, ultraviolet absorbers, light stabilizers, anti-aging agents, plasticizers, adhesion promoters, thermal polymerization initiators, photo bases generators, colorants, inorganic particles, elastomer particles, basic compounds, photoacid generators, photoacid multipliers, chain transfer agents, antistatic agents, flow regulators, defoamers, dispersants, or a combination thereof.

The additive (F) may be 0 part by weight to 10 parts by weight, preferably 0 part by weight to 5 parts by weight, relative to 100 parts by weight of the monomer mixture (A).

<Preparation of Resin Composition>

There is no particular restriction on the preparation of the resin composition. Any suitable way to mix various components can be selected as needed. For example, the monomer mixture (A), the siloxane compound (B), the curing agent (C), and the inorganic particles (D) are placed in a stirrer to be stirred to be uniformly mixed into a solution. A solvent (E), an additive (F), or a combination thereof may also be added when needed. When given a uniform mixture, a liquid resin composition may be obtained.

<Cured Film>

This embodiment provides a cured film formed of the above-mentioned resin composition.

The cured film may be formed by coating the resin composition on a substrate to form a coating film, and subjecting the coating film to an exposure step or a post baking step.

The substrate may be a glass substrate, a metal substrate (such as a chromium substrate), a silicon wafer substrate, or a plastic base material (such as a polysulfone (PES) substrate or a polycarbonate (PC) substrate). There is no particular restriction on its type.

There is no particular restriction on the coating, which may include but not limited to bar coating, knife coating, spin coating, reverse coating, die coating, spray coating, roll coating, gravure coating, and microgravure coating.

When the resin composition contains a solvent, a soft baking step may be further performed after the coating step. There is no particular restriction on the soft baking step, and it may be, for example, heating in an oven or a hot plate. There is no particular restriction on the temperature of the soft baking, and it may be, for example, 100° C. to 120° C. There is no particular restriction on the time of the soft baking, and it may be, for example, 60 seconds to 120 seconds.

There is no particular restriction on the light used in the exposure step, and it may be, for example, ultraviolet rays such as g-line, h-line, or i-line. There is no particular restriction on the light source used in the exposure step, and it may be, for example, a high-pressure mercury lamp, an ultra-high-pressure mercury lamp, or a metal halide lamp. The exposure amount of the exposure step may be 250 mJ/cm$^2$ to 1000 mJ/cm$^2$.

There is no particular restriction on the post baking, and it may be for example, heating in an oven or a hot plate. There is no particular restriction on the temperature of the post baking, and it may be, for example, 120° C. to 150° C. There is no particular restriction on the time of the post baking, and it may be, for example, 30 minutes to 60 minutes.

In one embodiment, the thickness of the cured film is 1 μm to 500 μm.

In one embodiment, the cured film has a refractive index of 1.70 or more for light having a wavelength of 550 nm.

In one embodiment, the cured film has an average transmittance of 95% or more for light having a wavelength of 400 nm to 700 nm.

The cured film of this embodiment has high refractive index, high transmittance, high thermal yellowing resistance, and high thermal impact resistance, and thus it is beneficial to subsequent processing and has a wider range of applications. Specifically, the cured film of this embodiment may be applied to all kinds of optical components, such as spectacle lenses, Fresnel lenses, plastic lenses, optical protective films, anti-reflection films, packaging materials for light-emitting diode (LED), and optical clear resin (OCR) with high refractive index for micro-LED.

The present disclosure is described in detail hereinafter with reference to several examples. The following examples are provided to describe the present disclosure. The scope of the present disclosure includes the scope and its substitutions and modifications of the following claims, and it is not limited to the scope of the experiments.

Examples and Comparative Examples of Resin Composition and Cured Film

Examples 1 to 8 and comparative examples 1 to 7 of the resin composition and cured film are described hereinafter.

Example 1

I. Resin Composition 41.2 parts by weight of modified bisphenol fluorene diacrylate (corresponding to component A-1-1; manufactured by HANNONG CHEMICALS INC.), 23.5 parts by weight of modified bisphenol fluorene diacrylate (corresponding to ingredient A-1-2; manufactured by Miwon Co., Ltd.), 11.8 parts by weight of pentaerythritol tetrakis(3-mercaptobutyrate) (corresponding to ingredient A-2), 23.5 parts by weight of ortho-phenyl phenoxy ethyl acrylate (OPPEA) (corresponding to component A-3), 5.9 parts by weight of (3-mercaptopropyl)trimethoxysilane (corresponding to component B-1), 2.4 parts by weight of (diphenyl(2,4,6-trimethylbenzoyl)phosphine oxide (product name: TPO, manufactured by BASF, corresponding to component C-1), and 11.8 parts by weight of zirconia (whose average particle size is 15.3 nm) (corresponding to component D-1) were mixed and stirred evenly with a stirrer to obtain the resin composition of Example 1.

II. Cured Film

The resin composition prepared in Example 1 was coated on a glass substrate with a blade coater (model: 1133N, manufactured by Sheen Instruments Ltd, with a slit pitch of 200 μm). A high-pressure mercury lamp (including g-line, h-line, or i-line) was then used to irradiate the resin composition on the substrate with an exposure amount of 250 mJ/cm$^2$ to obtain a cured film with a thickness of 200 μm. The cured film formed thereof was subjected to the evaluations below, and the results are shown in Table 1.

Examples 2 to 5 and Comparative Examples 1 to 6

The resin compositions and the cured films of Examples 2 to 5 and Comparative Examples 1 to 6 were prepared in the same steps as Example 1, and their differences were the component types of the resin composition and the used amounts (as shown in Table 1 and Table 2). The cured films formed of the resin compositions were subjected to the evaluations below, and the results are shown in Table 1 and Table 2.

Example 6

I. Resin Composition

The resin composition of Example 6 was prepared by the same steps as the resin composition of Example 1, and their difference was the component types of the resin composition and the used amounts (as shown in Table 1).

II. Cured Film

The resin composition prepared in Example 6 was coated on a glass substrate with a spin coater (model: MS-A150, manufactured by MIKASA CO., LTD.). The substrate coated with the resin composition was then placed in an oven at 150° C. for post baking for 30 minutes. As the result, a cured film with a thickness of 10 μm was obtained. The cured film formed thereof was subjected to the evaluations below, and the results are shown in Table 1.

Examples 7, 8, and Comparative Example 7

The resin composition and the cured film of Examples 7, 8, and Comparative Example 7 were prepared in the same steps as in Example 6, and their differences were the component types of the resin composition and the used amounts (as shown in Table 1 and Table 2). The cured films formed of the resin composition were subjected to the following evaluations, and the results are shown in Table 1 and Table 2.

TABLE 1

| Composition (unit: parts by weight) | | Example | | | | | | | |
|---|---|---|---|---|---|---|---|---|---|
| | | 1 | 2 | 3 | 4 | 5 | 6 | 7 | 8 |
| Monomer mixture (A) | A-1-1 | 41.2 | 37.5 | 41.2 | 40.0 | 66.7 | 66.8 | 36.2 | 38.5 |
| | A-1-2 | 23.5 | 25.0 | 0 | 0 | 0 | 0 | 0 | 0 |
| | A-2 | 11.8 | 12.5 | 11.8 | 13.3 | 11.1 | 0 | 0 | 0 |
| | A-3 | 23.5 | 25.0 | 47.1 | 46.7 | 22.2 | 33.2 | 33.2 | 48.4 |
| | A-4 | 0 | 0 | 0 | 0 | 0 | 0 | 24.5 | 10.4 |
| | A-5 | 0 | 0 | 0 | 0 | 0 | 0 | 6.1 | 2.7 |
| Total monomer mixture (A) | | 100 | 100 | 100 | 100 | 100 | 100 | 100 | 100 |
| Siloxane compound (B) | B-1 | 5.9 | 0 | 5.9 | 6.7 | 5.6 | 6.1 | 6.1 | 6.5 |
| | B-2 | 0 | 12.5 | 0 | 0 | 0 | 0 | 0 | 0 |
| | B-3 | 0 | 0 | 0 | 0 | 0 | 0 | 0 | 0 |
| Total siloxane compounds (B) | | 5.9 | 12.5 | 5.9 | 6.7 | 5.6 | 6.1 | 6.1 | 6.5 |
| Curing agent (C) | C-1 | 2.4 | 2.5 | 2.4 | 2.7 | 2.3 | 0 | 0 | 0 |
| | C-2 | 0 | 0 | 0 | 0 | 0 | 0 | 0 | 0 |
| | C-3 | 0 | 0 | 0 | 0 | 0 | 2.5 | 2.3 | 2.4 |
| | C-4 | 0 | 0 | 0 | 0 | 0 | 0 | 0.3 | 0.3 |
| Total curing agent (C) | | 2.4 | 2.5 | 2.4 | 2.7 | 2.3 | 2.5 | 2.6 | 2.7 |
| Inorganic particles (D) | D-1 | 11.8 | 12.5 | 11.8 | 26.7 | 5.6 | 0 | 0 | 0 |
| | D-2 | 0 | 0 | 0 | 0 | 0 | 0 | 0 | 0 |
| | D-3 | 0 | 0 | 0 | 0 | 0 | 0 | 0 | 0 |
| | D-4 | 0 | 0 | 0 | 0 | 0 | 16.5 | 16.5 | 24.1 |
| Total inorganic particles (D) | | 11.8 | 12.5 | 11.8 | 26.7 | 5.6 | 16.5 | 16.5 | 24.1 |
| Evaluation | Refractive index | 1.63 | 1.62 | 1.64 | 1.62 | 1.61 | 1.67 | 1.64 | 1.70 |
| | Transmittance | 96.7 | 95.8 | 96.2 | 95.1 | 97.1 | 97.8 | 98.2 | 97.3 |
| | Thermal yellowing resistance | ○ | ○ | ○ | Δ | ○ | ○ | ○ | ○ |
| | Thermal impact resistance | ○ | ○ | ○ | ○ | ○ | ○ | ○ | ○ |

TABLE 2

| Composition (unit: parts by weight) | | Comparative example | | | | | | |
|---|---|---|---|---|---|---|---|---|
| | | 1 | 2 | 3 | 4 | 5 | 6 | 7 |
| Monomer mixture (A) | A-1-1 | 44.4 | 44.4 | 0 | 37.5 | 37.5 | 37.5 | 42.3 |
| | A-1-2 | 22.2 | 0 | 70.0 | 0 | 0 | 25.0 | 0 |
| | A-2 | 11.1 | 11.1 | 10.0 | 12.5 | 12.5 | 12.5 | 0 |
| | A-3 | 22.2 | 44.4 | 20.0 | 50.0 | 50.0 | 25.0 | 45.4 |
| | A-4 | 0 | 0 | 0 | 0 | 0 | 0 | 9.8 |
| | A-5 | 0 | 0 | 0 | 0 | 0 | 0 | 2.5 |
| Total monomer mixture (A) | | 100 | 100 | 100 | 100 | 100 | 100 | 100 |
| Siloxane compound (B) | B-1 | 0 | 0 | 0 | 0 | 0 | 0 | 0 |
| | B-2 | 0 | 0 | 0 | 0 | 0 | 0 | 0 |
| | B-3 | 0 | 0 | 0 | 0 | 0 | 13 | 0 |
| Total siloxane compounds (B) | | 0 | 0 | 0 | 0 | 0 | 13 | 0 |
| Curing agent (C) | C-1 | 2.3 | 2.3 | 2.0 | 2.5 | 2.5 | 2.4 | 0 |
| | C-2 | 0 | 0 | 0 | 0 | 0 | 0.1 | 0 |
| | C-3 | 0 | 0 | 0 | 0 | 0 | 0 | 2.3 |
| | C-4 | 0 | 0 | 0 | 0 | 0 | 0 | 0.3 |
| Total curing agent (C) | | 2.3 | 2.3 | 2.0 | 2.5 | 2.5 | 2.5 | 2.6 |
| Inorganic particles (D) | D-1 | 11.1 | 11.1 | 0 | 0 | 0 | 12.5 | 0 |
| | D-2 | 0 | 0 | 0 | 25.0 | 0 | 0 | 0 |
| | D-3 | 0 | 0 | 0 | 0 | 25.0 | 0 | 0 |
| | D-4 | 0 | 0 | 0 | 0 | 0 | 0 | 22.7 |
| Total inorganic particles (D) | | 11.1 | 11.1 | 0 | 25.0 | 25.0 | 12.5 | 22.7 |
| Evaluation | Refractive index | 1.63 | 1.64 | 1.58 | 1.63 | 1.63 | 1.55 | 1.70 |
| | Transmittance | 96.4 | 95.5 | 88.1 | 75.0 | <1 | 97.0 | 97.1 |
| | Thermal yellowing resistance | ○ | ○ | X | Δ | X | ○ | ○ |
| | Thermal impact resistance | X | X | X | X | X | X | X |

The corresponding compound/product name of each component in Table 1 and Table 2 is shown in Table 3.

TABLE 3

| Ingredient | Compound/Product Name |
|---|---|
| A-1-1 | A mixture of modified bisphenol fluorene diacrylate (manufactured by HANNONG CHEMICALS INC.) |

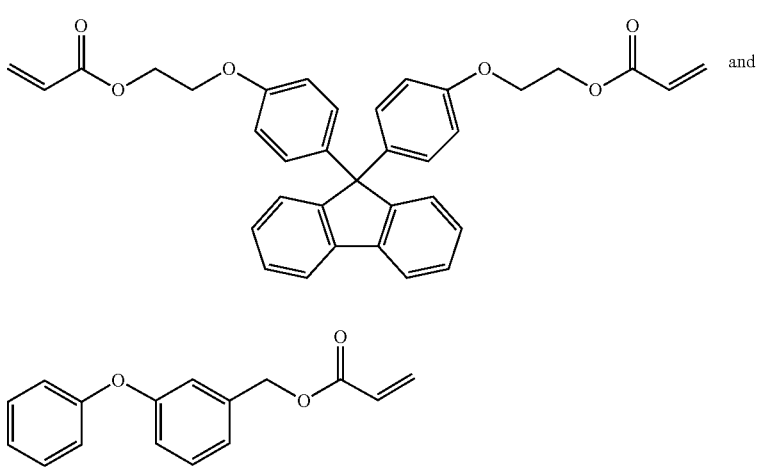

and (the weight ratio is 10:1 to 1:1)

TABLE 3-continued

| Ingredient | Compound/Product Name |
| --- | --- |
| A-1-2 | Modified bisphenol fluorene diacrylate (manufactured by Miwon Co., Ltd.) |

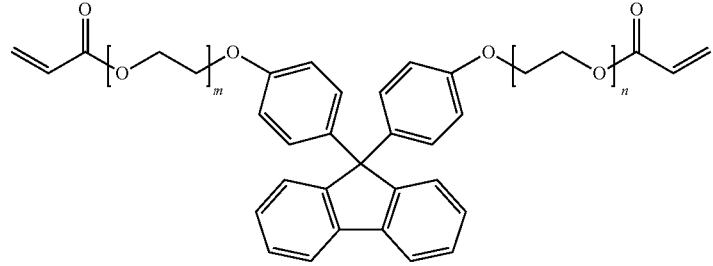

(where m and n each independently represent an integer of 1 to 9, and the sum of m and n is 10)

| | |
| --- | --- |
| A-2 | Pentaerythritol tetrakis(3-mercaptobutyrate) |
| A-3 | ortho-phenyl phenoxy ethyl acrylate (OPPEA) |
| A-4 | Product name: Celloxide 8010 (alicyclic epoxy compounds having a cycloalkene oxide structure, manufactured by Daicel Corporation) |
| A-5 | Product name: THM402 (compounds with methacryloyl and oxetanyl, manufactured by TRONLY ENTERPRISE CO., LIMITED) |
| B-1 | (3-mercaptopropyl)trimethoxysilane |
| B-2 | |

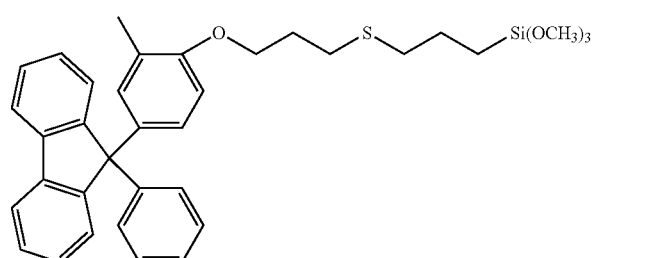

Formula (II-1)

| | |
| --- | --- |
| B-3 | Product name: SILIKOPON EF (polysiloxane resin containing epoxy groups, manufactured by Evonik Industries AG) |
| C-1 | diphenyl(2,4,6-trimethylbenzoyl)phosphine oxide |
| C-2 | Product name: TR-PAG-204S (4-(phenylthio)phenyl diphenyl sulfonium hexafluorophosphate, manufactured by TRONLY ENTERPRISE CO., LIMITED) |
| C-3 | 2-Ethylhexanoate tert-butyl peroxide |
| C-4 | Product name: CXC-1612 (manufactured by King Industries, Inc.) |
| D-1 | Zirconia (average particle size is 15.3 nm) |
| D-2 | Zirconia (average particle size is 30 to 40 nm) |
| D-3 | Zirconia (average particle size is 51.4 nm) |
| D-4 | Titanium oxide (average particle size is 9.5 nm) |

EVALUATION a. Refractive Index

The resin composition was first mixed with propylene glycol monomethyl ether acetate at a weight ratio of 1:1. After the mixture was evenly stirred with a stirrer, the mixture of the resin composition and the propylene glycol monomethyl ether acetate was coated with a spin coater (model: MS-A150, manufactured by MIKASA CO., LTD.) on the chromium substrate. Next, the chromium substrate coated with the mixture was placed on a hot plate for soft baking at 100° C. for 60 seconds. Then, a high-pressure mercury lamp was used to irradiate the chromium substrate coated with the mixture at an exposure of 250 mJ/cm²; or, the chromium substrate coated with the mixture was placed in an oven at 150° C. for post baking for 30 minutes. As the result, a cured film for refractive index measurement with a thickness of 1.0 μm was obtained. Finally, an ellipsometer (model: M-2000VI, manufactured by J. A. Woollam Co. Inc.) was used to measure the refractive index of the formed cured film at a wavelength of 550 nm.

b. Transmittance

A UV-Visible spectrometer (model: U2900, manufactured by Hitachi High-technologies Corporation) was used to measure the average transmittance of the cured film formed at a wavelength of 400 to 900 nm respectively.

c. Thermal Yellowing Resistance

The formed cured film was placed in an oven at 120° C. for 4 hours, and then a whiteness meter (model: CM-2600d, manufactured by Konica Minolta) was used to measure the Δb* of the cured film to evaluate the thermal yellowing resistance of the cured film.

○: Δb*<0.5;

Δ: 0.5≤Δb*<1.0;

X: 1.0≤Δb*.

d. Thermal Impact Resistance

After the formed cured film was subjected to the thermal impact resistance test, visually observe whether there are cracks or breakages in the appearance of the cured film. The so-called "thermal impact resistance test" refers to the test in which the cured film is subjected to 75 heat-and-cold cycles, and each of the cycle has the temperature increased from −35° C. to 75° C. and then decreased from 75° C. to −35° C.

○: No crack or breakage observed;

X: Crack or breakage observed.

EVALUATION RESULT

It can be seen from Table 1 that when the resin composition contains a monomer mixture (A) including a bisphenol fluorene compound (A-1), a siloxane compound (B) having a group represented by Formula (II-a), the curing agent (C), and the inorganic particles (D) (Examples 1 to 8), the cured film formed thereof not only meets the requirements for high refractive index and high transmittance, but also has high thermal yellowing resistance and high thermal impact resistance, and thus the cured film formed is suitable for optical components.

In contrast, when the resin composition does not contain the siloxane compound (B) having a group represented by Formula (II-a) (Comparative Examples 1 to 7), the cured film formed thereof does not have the high refractive index, high transmittance, high thermal yellowing resistance, and high thermal impact resistance at the same time, so the formed cured film is not suitable for optical components. Furthermore, when the composition does not contain the siloxane compound (B) having a group represented by Formula (II-a) (Comparative Examples 1 to 7), the cured film formed thereof has poor thermal impact resistance.

In summary, as the resin composition of the present disclosure contains a specific monomer mixture (A), a specific siloxane compound (B), a curing agent (C), and inorganic particles (D), the cured film formed thereof has high refractive index, high transmittance, high thermal yellowing resistance, and high thermal impact resistance, which is beneficial to subsequent processing and has a wider range of applications, so it is suitable for various optical components.

Although the present disclosure has been disclosed in the above embodiments, it is not intended to limit the present disclosure. Anyone with ordinary knowledge in the relevant technical field can make some changes and modifications without departing from the spirit and scope of the present disclosure. The scope of protection of the present disclosure shall be subject to those defined by the claims attached.

What is claimed is:

1. A resin composition, comprising:

a monomer mixture (A), comprising a bisphenol fluorene compound (A-1) represented by Formula (I-1), a thiol compound (A-2) having two or more groups represented by Formula (I-2), and an ethylenically unsaturated group-containing compound (A-3) represented by Formula (I-3);

a siloxane compound (B), having a group represented by Formula (II-a);

a curing agent (C); and inorganic particles (D), wherein

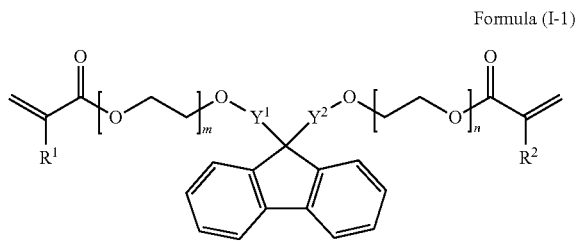

Formula (I-1)

in Formula (I-1), $R^1$ and $R^2$ each independently represent a hydrogen atom or a methyl group, $Y^1$ and $Y^2$ each independently represent a substituted phenylene group, or an unsubstituted phenylene group, and m and n each independently represent an integer of 1 to 9, Formula (I-2)

in Formula (I-2), * represents a bonding position,

Formula (I-3)

in Formula (I-3), $R^6$ represents a hydrogen atom or a methyl group, and t is an integer of 1 to 3, and Formula (II-a)

in Formula (II-a), $R^3$, $R^4$, and $R^5$ each independently represent an alkyl group having a carbon number of 1 to 3, and * represents a bonding position, wherein based on 100 parts by weight of the monomer mixture (A), the bisphenol fluorene compound (A-1) is 35 parts by weight to 70 parts by weight, the thiol compound (A-2) is 11.1 parts by weight to 15 parts by weight, the ethylenically unsaturated group-containing compound (A-3) is 18.9 parts by weight to 50 parts by weight, and the siloxane compound (B) is 5 parts by weight to 20 parts by weight, wherein a cured film formed of the resin composition has a refractive index of 1.61 or more for light having a wavelength of 550 nm, has an average transmittance of 95.1% or more for light having a wavelength of 400 nm to 700 nm, has a yellow-blue chromaticity difference of less than 1.0 after the cured film was placed in an oven at a temperature of 120° C. for 4 hours, and has no crack or breakage after the cured film is subjected to 75 heat-and-cold cycles, wherein each of the cycles has the temperature increased from −35° C. to 75° C. and then decreased from 75° C. to −35° C.

2. The resin composition according to claim 1, wherein the inorganic particles (D) comprise zirconium oxide, titanium oxide, or a combination thereof.

3. The resin composition according to claim 1, wherein an average refractive index of the inorganic particles (D) is 1.67 or more for light having a wavelength of 400 nm to 700 nm.

4. The resin composition according to claim 1, wherein an average particle diameter of the inorganic particles (D) is 5 nm to 100 nm.

5. The resin composition according to claim 1, wherein the curing agent (C) is 1 part by weight to 10 parts by weight, and the inorganic particle (D) is 5 parts by weight to 30 parts by weight relative to 100 parts by weight of the monomer mixture (A).

6. A cured film formed of the resin composition according to claim 1.

* * * * *